(12) United States Patent
Yamazaki

(10) Patent No.: US 8,446,636 B2
(45) Date of Patent: May 21, 2013

(54) VARIABLE PRINTING SYSTEM

(75) Inventor: Hideyuki Yamazaki, Sagamihara (JP)

(73) Assignee: Konica Minolta Business Technologies, Inc. (JP)

( * ) Notice: Subject to any disclaimer, the term of this patent is extended or adjusted under 35 U.S.C. 154(b) by 540 days.

(21) Appl. No.: 12/828,070

(22) Filed: Jun. 30, 2010

(65) Prior Publication Data

US 2011/0013209 A1    Jan. 20, 2011

(30) Foreign Application Priority Data

Jul. 17, 2009   (JP) .................................. 2009-168454

(51) Int. Cl.
*H04N 1/60* (2006.01)
*G06F 3/12* (2006.01)

(52) U.S. Cl.
USPC ........... 358/1.9; 358/3.28; 715/234; 715/251; 715/255

(58) Field of Classification Search
USPC ......... 358/1.9, 2.1, 1.15, 1.18, 3.28; 715/234, 715/251, 255
See application file for complete search history.

(56) References Cited

U.S. PATENT DOCUMENTS

| 2002/0165883 | A1* | 11/2002 | Sans et al. ..................... 707/530 |
| 2005/0125722 | A1* | 6/2005 | Mistry et al. ................. 358/3.28 |
| 2008/0259392 | A1* | 10/2008 | Tokumoto .................... 358/1.15 |
| 2009/0300479 | A1* | 12/2009 | Kuranoshita .................. 715/234 |
| 2011/0261412 | A1* | 10/2011 | Nakatsuka ................... 358/1.18 |

FOREIGN PATENT DOCUMENTS

| JP | 2001-199105 | 7/2001 |
| JP | 2006-237825 | 9/2006 |

* cited by examiner

*Primary Examiner* — Kimberly A Williams
(74) *Attorney, Agent, or Firm* — Squire Sanders (US) LLP

(57) ABSTRACT

Disclosed is a variable printing system, which makes it possible to efficiently implement a variable printing, based on streamed variable print data. The variable printing system includes: the variable print data generating apparatus that creates variable print data in which an identifier, indicating an instruction for deleting a specific reusable object that will not be used in following pages, is embedded into a potion for describing page information including information in regard to the specific reusable object, and streams the above-created variable print data; and the variable printing control apparatus that receives the streamed variable print data to rasterized the concerned object, and synthesizes the rasterized data with each other so as to create image data for every page, and at the same time, conducts such the controlling operation to delete specific rasterized data of the specific reusable object, designated by the identifier, from the cache memory.

3 Claims, 11 Drawing Sheets

FIG. 1
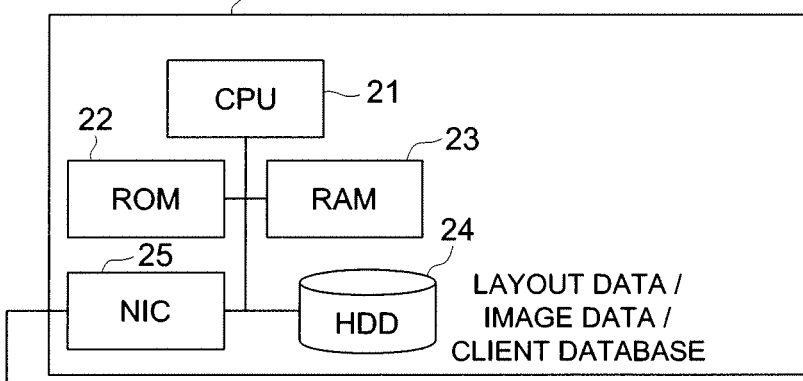
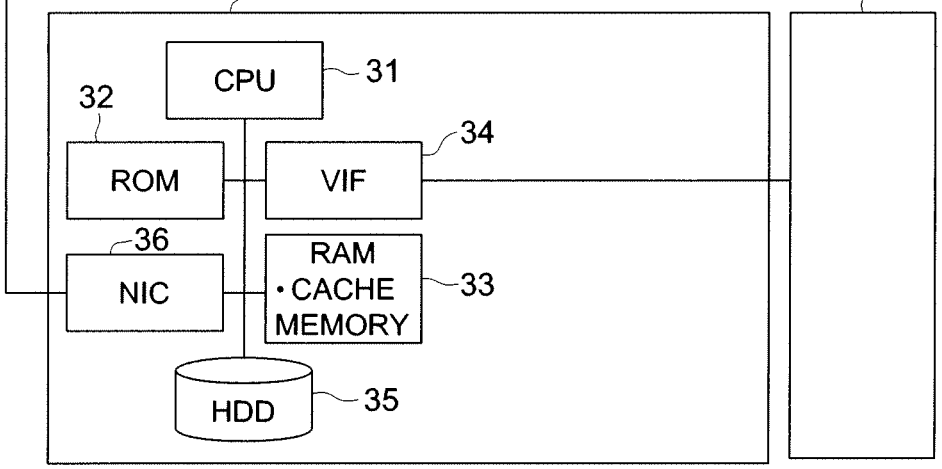

FIG. 5

(a): PAGE IMAGE INTERNAL DATABASE

| # | ADDRESS | NAME | FILED 1 | FILED 2 | FILED 3 |
|---|---|---|---|---|---|
| 1 | 150-0002 3-4-6 Shibuya Shibuya-ku | Teppei Shibutani | IMAGE A | IMAGE C | IMAGE G |
| 2 | 103-0023 1-2-3 Nihonbashi Chuo-ku | Ichiro Sugiyama | IMAGE A | IMAGE D | IMAGE G |
| 3 | 102-8557 2-19-5 Iidabashi Chiyoda-ku | Hanako Suzuki | IMAGE B | IMAGE C | IMAGE E |
| 4 | 141-0022 3-14-5 Osaki Shinagawa-ku | Yuko Yamaguchi | IMAGE B | IMAGE D | IMAGE F |
| 5 | 141-0031 1-22-22 Gotanda Shinagawa-ku | Masaki Saito | IMAGE A | IMAGE C | IMAGE F |
| 6 | 123-0841 1-4-6 Nishiarai Adachi-ku | Taro Okamoto | IMAGE A | IMAGE D | IMAGE F |
| 7 | 170-0013 4-40-1 Ikebukuro Toshima-ku | Takeo Aoki | IMAGE A | IMAGE C | IMAGE E |

SORTING ACCORDING TO NUMBER OF THE "IMAGES A" OF "FIELD 1"

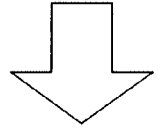

(b): SORTING IMAGES IN ORDER OF USAGE FREQUENCY OF FIELD INCLUDING IMAGE WHOSE USAGE FREQUENCY IS HIGHEST

| # | ADDRESS | NAME | FILED 1 | FILED 2 | FILED 3 |
|---|---|---|---|---|---|
| 1 | 150-0002 3-4-6 Shibuya Shibuya-ku | Teppei Shibutani | IMAGE A | IMAGE C | IMAGE G |
| 2 | 103-0023 1-2-3 Nihonbashi Chuo-ku | Ichiro Sugiyama | IMAGE A | IMAGE D | IMAGE G |
| 5 | 141-0031 1-22-22 Gotanda Shinagawa-ku | Masaki Saito | IMAGE A | IMAGE C | IMAGE F |
| 6 | 123-0841 1-4-6 Nishiarai Adachi-ku | Taro Okamoto | IMAGE A | IMAGE D | IMAGE F |
| 7 | 170-0013 4-40-1 Ikebukuro Toshima-ku | Takeo Aoki | IMAGE A | IMAGE C | IMAGE E |
| 3 | 102-8557 2-19-5 Iidabashi Chiyoda-ku | Hanako Suzuki | IMAGE B | IMAGE C | IMAGE E |
| 4 | 141-0022 3-14-5 Osaki Shinagawa-ku | Yuko Yamaguchi | IMAGE B | IMAGE C | IMAGE F |

SORTING ACCORDING TO NUMBER OF THE "IMAGES A" OF "FIELD 1"

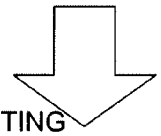

(c): PAGE IMAGE INTERNAL DATABASE AFTER SORTING

| # | ADDRESS | NAME | FILED 1 | FILED 2 | FILED 3 |
|---|---|---|---|---|---|
| 1 | 150-0002 3-4-6 Shibuya Shibuya-ku | Teppei Shibutani | IMAGE A | IMAGE C | IMAGE G |
| 5 | 141-0031 1-22-22 Gotanda Shinagawa-ku | Masaki Saito | IMAGE A | IMAGE C | IMAGE F |
| 7 | 170-0013 4-40-1 Ikebukuro Toshima-ku | Takeo Aoki | IMAGE A | IMAGE C | IMAGE E |
| 2 | 103-0023 1-2-3 Nihonbashi Chuo-ku | Ichiro Sugiyama | IMAGE A | IMAGE D | IMAGE G |
| 6 | 123-0841 1-4-6 Nishiarai Adachi-ku | Taro Okamoto | IMAGE A | IMAGE D | IMAGE F |
| 3 | 102-8557 2-19-5 Iidabashi Chiyoda-ku | Hanako Suzuki | IMAGE B | IMAGE C | IMAGE E |
| 4 | 141-0022 3-14-5 Osaki Shinagawa-ku | Yuko Yamaguchi | IMAGE B | IMAGE D | IMAGE F |

FIG. 6

(d): OVERALL IMAGE USAGE FREQUENCY TABLE

| FIELD 1 | FIELD 2 | FIELD 3 |
|---|---|---|
| IMAGE A = 5 | IMAGE C = 4 | IMAGE E = 2 |
| IMAGE B = 2 | IMAGE D = 3 | IMAGE F = 3 |
| | | IMAGE G = 2 |

(e): USAGE FREQUENCY TABLE
WITHIN DESIGNATED RANGE

| FIELD 2 | FIELD 3 |
|---|---|
| IMAGE C = 3 | IMAGE E = 1 |
| IMAGE D = 2 | IMAGE F = 2 |
| | IMAGE G = 2 |

FIG. 7

```
1:  <REUSABLE_OBJECT>                    ← DEFINITION OF REUSABLE OBJECT
2:    <OBJECT Position="0 0">
3:      <SOURCE Format="application/pdf" Dimension="612 774">
4:        <EXTERNAL_DATA_ARRAY Src="sample_2x5.pdf" Index="1" />
5:      </SOURCE>
6:    </OBJECT>
7:    <OCCURRENCE_LIST>
8:      <OCCURRENCE Name="BSKK_reusable0001" Weight="1">  ← DESIGNATION OF REUSABLE OBJECT NAME
9:        <VIEW>
10:         <TRANSFORM Matrix="-1.83691e-016 -1 1 -1.83691e-16 -555.732 692.63" />
11:         <CLIP_RECT Rectangle="-79.3701 555.732 218.268 694.63" />
12:       </VIEW>
13:     </OCCURRENCE>
14:   </OCCURRENCE_LIST>
15: </REUSABLE_OBJECT>  ← END OF DEFINITION OF REUSABLE OBJECT
16:
17:
18:
19: /******** USAGE EXAMPLE OF DELETION IDENTIFIER OF REUSABLE OBJECT ********/
20: <PRIVATE_INFO Creator="KM_BSKK" Identifier="DelReusableObj" >
21:   <DELETE_REUSABLE_OBJECT Name="BSKK_reusable0001" />
22: </PRIVATE_INFO>
```

VARIABLE PRINTING SYSTEM

This application is based on Japanese Patent Application NO. 2009-168454 filed on Jul. 17, 2009, with Japan Patent Office, the entire content of which is hereby incorporated by reference.

BACKGROUND OF THE INVENTION

The present invention relates to a variable printing system, and specifically relates to such a variable printing system that conducts variable printing based on streamed variable print data.

In recent years, there has been proliferated a methodology called the "Transaction Mail Promotion" in which documents, each such as a monthly bill, an account statement, etc., are respectively combined with a kind of promotion advertisement so as to mail the combined printed products to customers. The abovementioned methodology called the "Transaction Mail Promotion" employs the variable printing process, in which a reuse object is retained in a cache memory so as to improve the processing efficiency by reusing the reuse object repeatedly.

In this connection, a host computer is usually employed for conducting the above-mentioned transaction process in regard to the documents, such as account statements, etc., so as to enforce the high-speed mass production process and to convert the print data into stream data. Accordingly, the printing apparatus that receives such the stream data should sequentially process the data concerned. For this purpose, various kinds of methodologies to improve the processing efficiency of the printing apparatus concerned have been proposed so far.

For instance, Tokkai 2001-199105 (Japanese Patent Application Laid-Open Publication) sets forth a printing apparatus that utilizes the static page elements in the form of static page layout objects to shorten the print job transmission time, and is added with the function for memorizing the static page layout objects in such an optimized format that makes the number of memory factors of the concerned printer small.

Further, Tokkai 2006-237825 (Japanese Patent Application Laid-Open Publication) sets forth an image processing apparatus that makes it possible to shorten the time required for the data synthesizing operation that is necessary to create the page data, when the printing operation is conducted on the basis of such a print file that includes objects for specifying the page and at least one of the objects is used at plural positions within the print file concerned.

However, in the variable printing operation such as the "Transaction Mail Promotion" printing mode, although a large amount of cache memory should be possibly employed for storing the streamed variable print data therein, it becomes highly possible that a malfunction caused by a memory overflow of the cache memory would occur even if a mass storage device is mounted into the printing apparatus concerned. Further, when a large amount of data is stored into the cache memory, a considerable amount of time should be consumed to retrieve the reusable object stored in the cache memory, resulting in a deterioration of the processing efficiency.

To overcome the abovementioned problem, it may be considered to employ such a method that the reusable objects are sorted on the basis of usage frequencies of them so as to effectively use the cache memory, as set forth in the above-cited prior art references. However, according to the conventional technology, there has been such a problem that, since the sorting operation is conducted by an apparatus that controls the variable printing operation, such as a print controlling apparatus, a printing apparatus or the like, and accordingly, the sorting operation cannot be implemented after all of the variable print data have once received, it has been impossible to speedily conduct the sorting operation. In addition, there has been such another problem that, in order to store the image data acquired by rasterizing the variable print data into the cache memory, a large amount of memory resources has been required.

SUMMARY OF THE INVENTION

To overcome the abovementioned drawbacks in conventional image forming apparatus, it is one of objects of the present invention to provide a variable printing system, which makes it possible to efficiently implement a variable printing based on streamed variable print data.

Accordingly, at least one of the objects of the present invention can be attained by the variable printing systems described as follows.

(1) According to a variable printing system reflecting an aspect of the present invention, the variable printing system, comprises: a variable print data generating apparatus that creates variable print data and applies a stream processing to the variable print data so as to transmit streamed variable print data; a variable printing control apparatus that receives the streamed variable print data, transmitted by the variable print data generating apparatus, to sequentially create page image data one by one; and a communication network through which the variable print data generating apparatus and the variable printing control apparatus are coupled to each other, wherein the variable print data generating apparatus includes: a variable printing control section to create a database in which parts to be embedded into each of pages are aligned; a database operation section to sort the database by employing a reusable object, included in the parts, as a key, so as to create sorted database; and a variable print data generating section that creates the variable print data based on the sorted database, and embeds instruction information, representing an instruction for deleting a specific reusable object that will not be used in following pages, into a portion for describing page information including information in regard to the specific reusable object, and wherein the variable printing control apparatus includes: a variable language parsing section to parse the streamed variable print data, transmitted by the variable print data generating apparatus, and to discriminate the instruction information; a RIP (Raster Image Processor) section to rasterize objects including the reusable object and the specific reusable object; an image synthesizing section to synthesize rasterized data sets, acquired by rasterizing the objects, so as to create image data for every page; and an object management section that stores the rasterized data sets, acquired by rasterizing the objects in the RIP section, into a cache memory, and then, deletes a specific rasterized data set, acquired by rasterizing the specific reusable object instructed by the instruction information, from the cache memory, after the image synthesizing section creates image data of a page in which the instruction information is embedded.

(2) According to another aspect of the present invention, in the variable printing system recited in item 1, the database operation section sorts the database by employing a reusable object, a usage frequency of which is highest, as a key, so as to group pages including the concerned reusable object.

(3) According to still another aspect of the present invention, in the variable printing system recited in item 1 or item 2, the variable print data is written in a PPML (Personalized Print Markup Language), and the instruction information is defined in a "PRIVATE_INFO" element.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 shows a schematic block diagram of a configuration of a variable printing system embodied in the present invention;

FIG. 5 shows a schematic diagram indicating an exemplary process for sorting and grouping a page image internal database;

FIG. 6 shows a schematic diagram indicating exemplary tables of usage times of various kinds of images;

FIG. 7 shows a code list indicating an example of deletion identifier;

DETAILED DESCRIPTION OF THE PREFERRED EMBODIMENT

Figure 2:
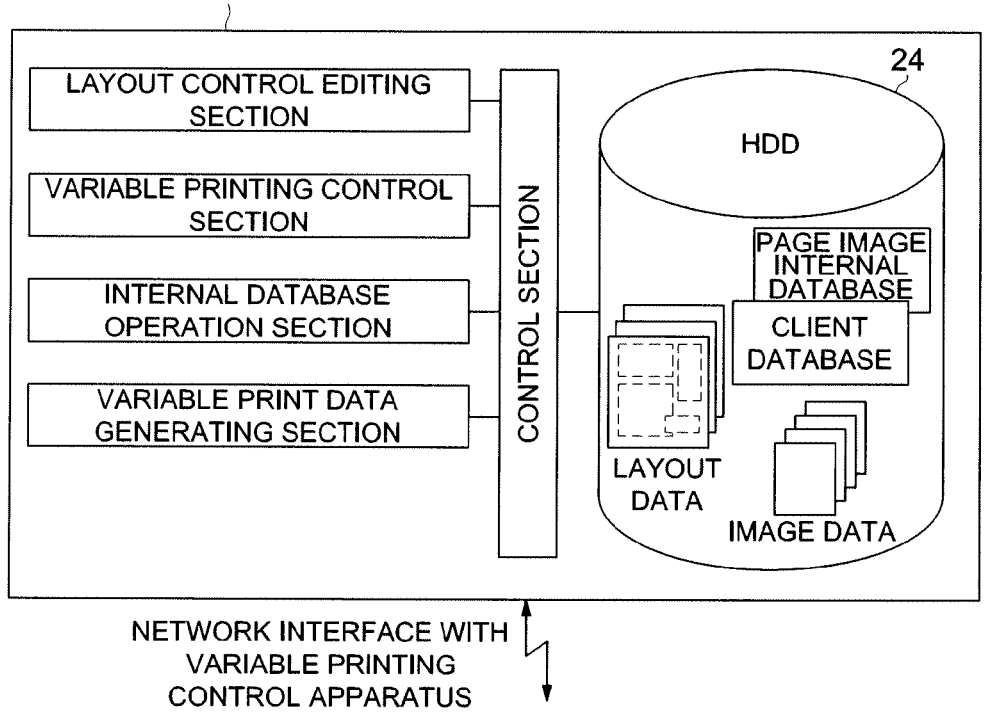
FIG. 2 shows a schematic block diagram indicating a configuration of a variable print data generating apparatus embodied in the present invention.

As described in the "background of the invention, it is impossible for the apparatus that controls the variable printing operation to determine the term for retaining the object stored in the cache memory. Accordingly, since all of the reusable objects should be retained within the apparatus until the concerned job has completed, the apparatus has to employ a large amount of cache memory.

Generally speaking, since an amount of cache memory to be equipped in the variable printing apparatus is limited to a certain capacity, when the capacity of the cache memory becomes short, data to be stored in the cache memory is evacuated to the HDD (Hard Disc Drive) or a vacant memory area is forcibly created by compressing the data to be stored in the cache memory. According to the abovementioned methods, however, the efficiency of the variable printing apparatus would be considerably deteriorated, or processing errors would frequently occur due to the shortage of memory resources.

Alternatively, it is also possible for the variable printing control apparatus side to sort the reusable objects based on usage frequencies of them, so as to delete a reusable object remaining unused from the cache memory. According to this method, however, it is impossible to implement the sort processing until all of the variable print data has received, resulting in difficulty of a rapid implementation of the concerned processing. In addition, since an amount of rasterized object data is considerably large, a large amount of memory resources having a massive capacity should be provided to retain all of the rasterized object data within the apparatus.

To overcome the abovementioned drawbacks, the present inventor proposes a novel method for conducting the sort processing based on a variable printing command in the variable print data generating apparatus side, instead of the conventional method for conducting the operation for sorting the reusable objects in the variable printing control apparatus side.

Concretely speaking, in the variable print data generating apparatus, a database, in which various kinds of parts to be embedded into each of pages of the variable printing are aligned, is created, and the created database is sorted into groups by employing a key that is a reusable object (preferably, a reusable object having the highest usage frequency) among the concerned parts, and then, the variable print data is created by embedding an identifier for instructing deletion of a specific reusable object that does not appear after the grouped print data, therein, so as to transmit the above-created variable print data as stream data.

On the other hand, in the variable printing control apparatus, the streamed variable print data is received, and object data is rasterized, and then, rasterized data of the reusable objects are stored into the cache memory and image data is created for every page. At the same time, the reusable objects designated by the identifier are deleted from the cache memory.

According to the abovementioned process of the present invention, it becomes unnecessary to suspend the implementation of the sort processing for specifying the unnecessary reusable object until the variable printing control apparatus has received all of the streamed variable print data, but it becomes possible to speedily implement the variable printing operation. Further, it also becomes unnecessary for the variable printing control apparatus to retain all of the reusable objects therein until the concerned job has completed, and therefore, it becomes possible to reduce the capacity of memory to be used.

Figure 3:
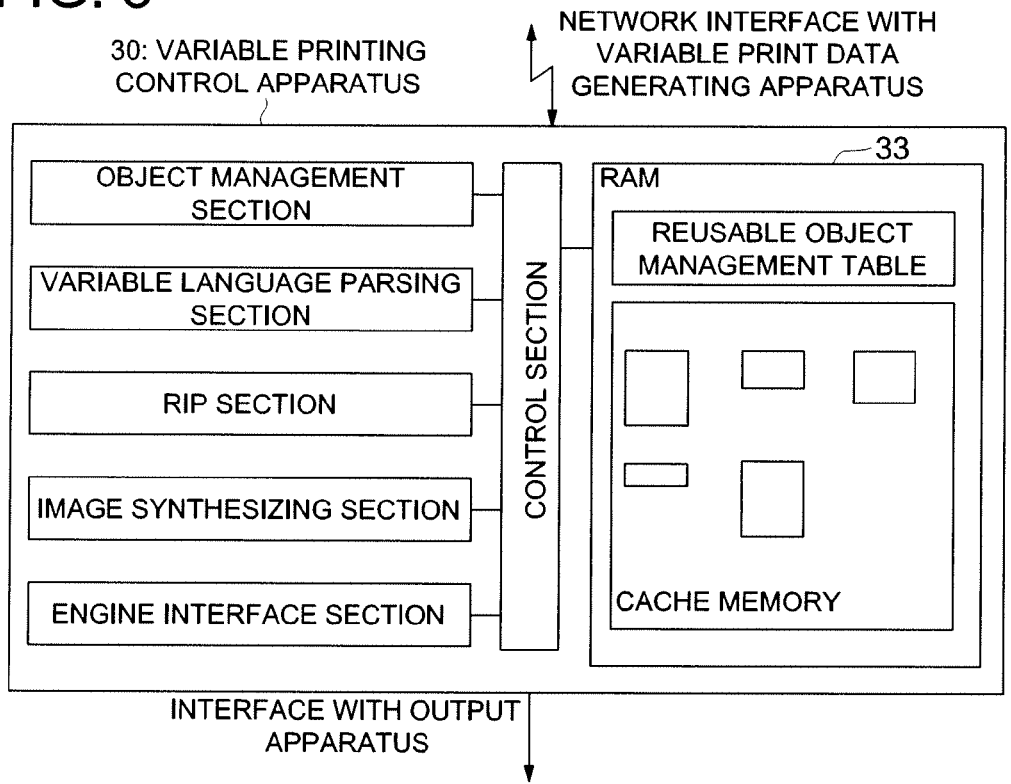
FIG. 3 shows a block diagram indicating a configuration of a variable printing control apparatus embodied in the present invention.
Figure 4:
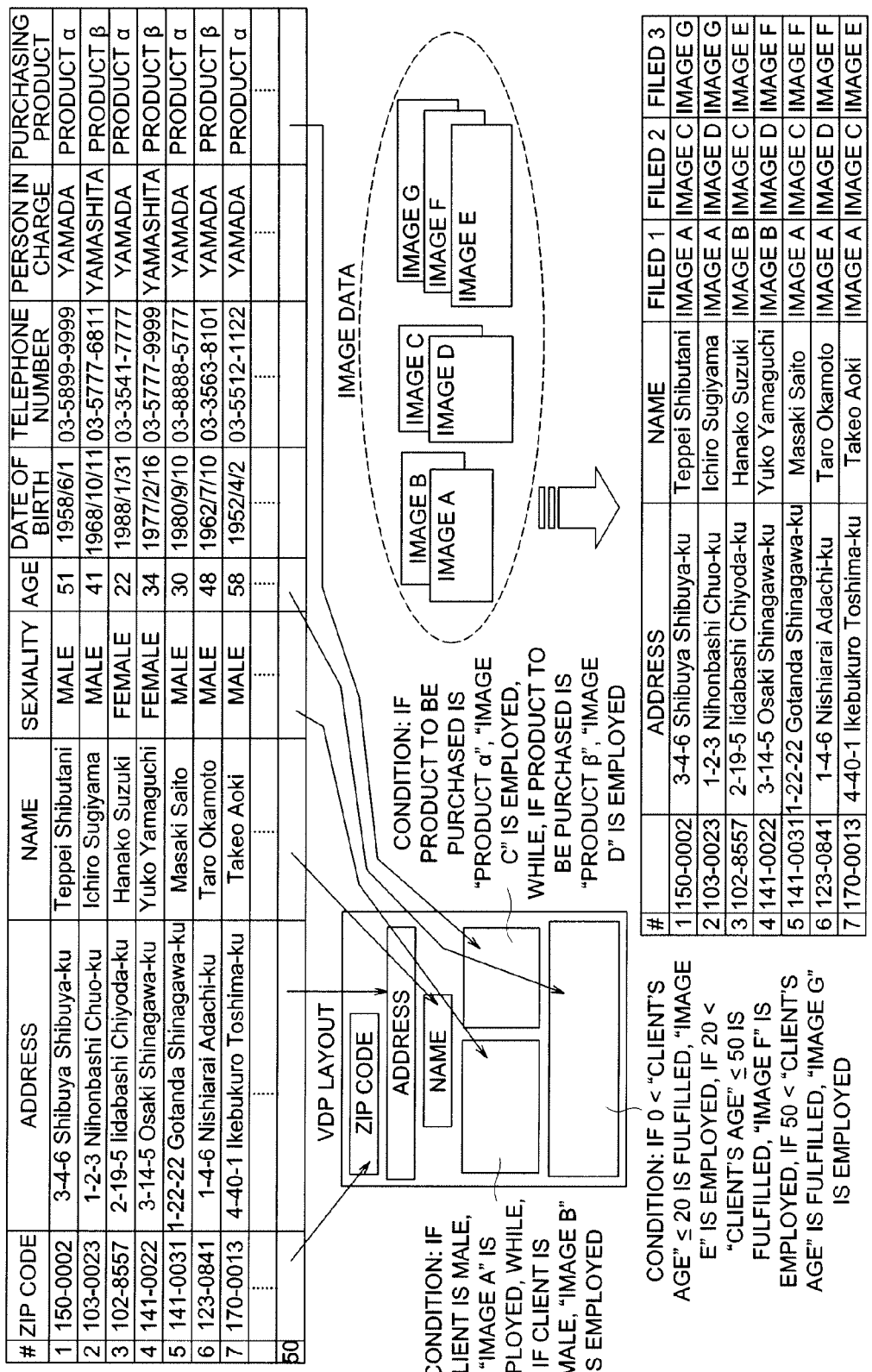
FIG. 4 shows a schematic diagram indicating a created example of a page image internal database.
Figure 8:
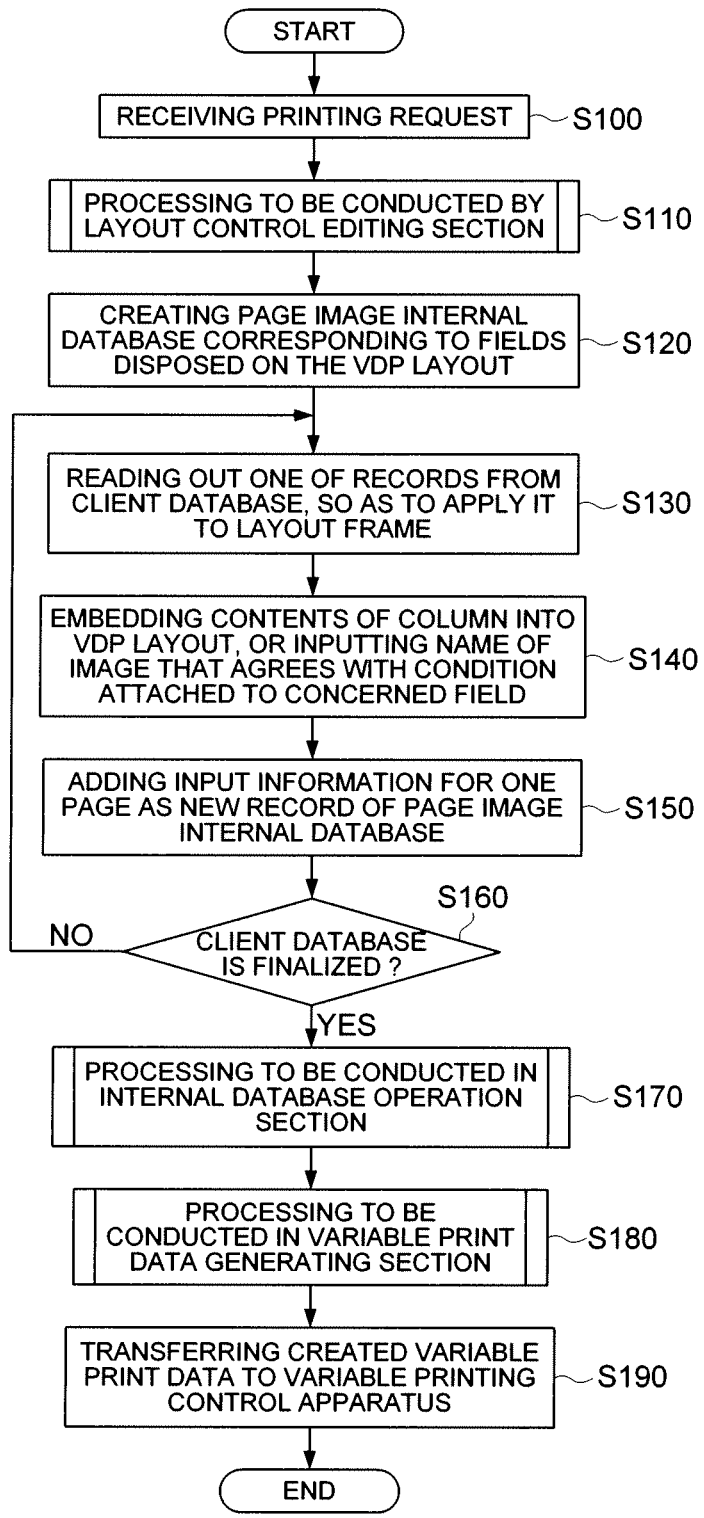
FIG. 8 shows a flowchart indicating a processing procedure to be implemented in a variable print data generating apparatus embodied in the present invention.
Figure 10:
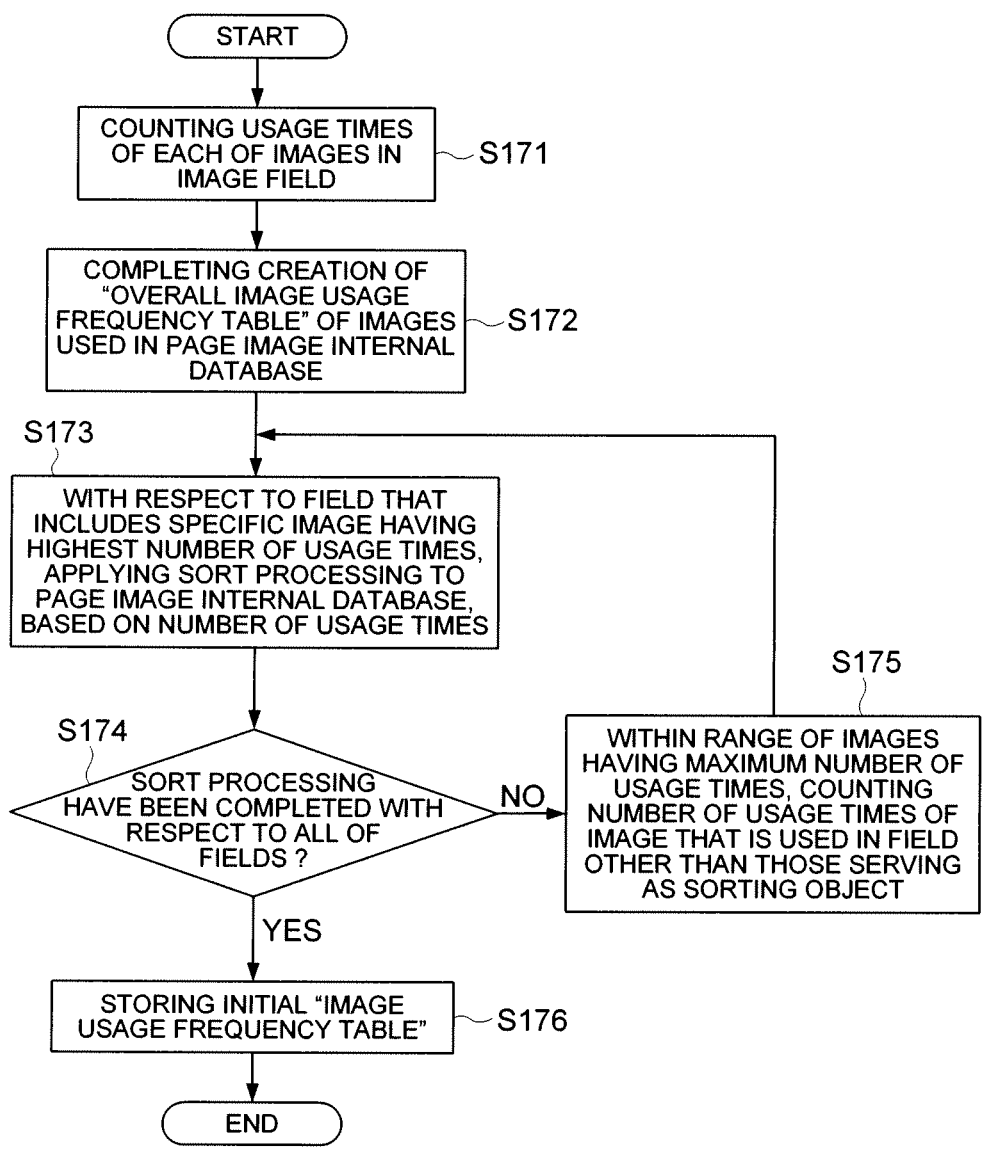
FIG. 10 shows a flowchart indicating a processing procedure to be implemented in an internal database operation section embodied in the present invention.
Figure 11:
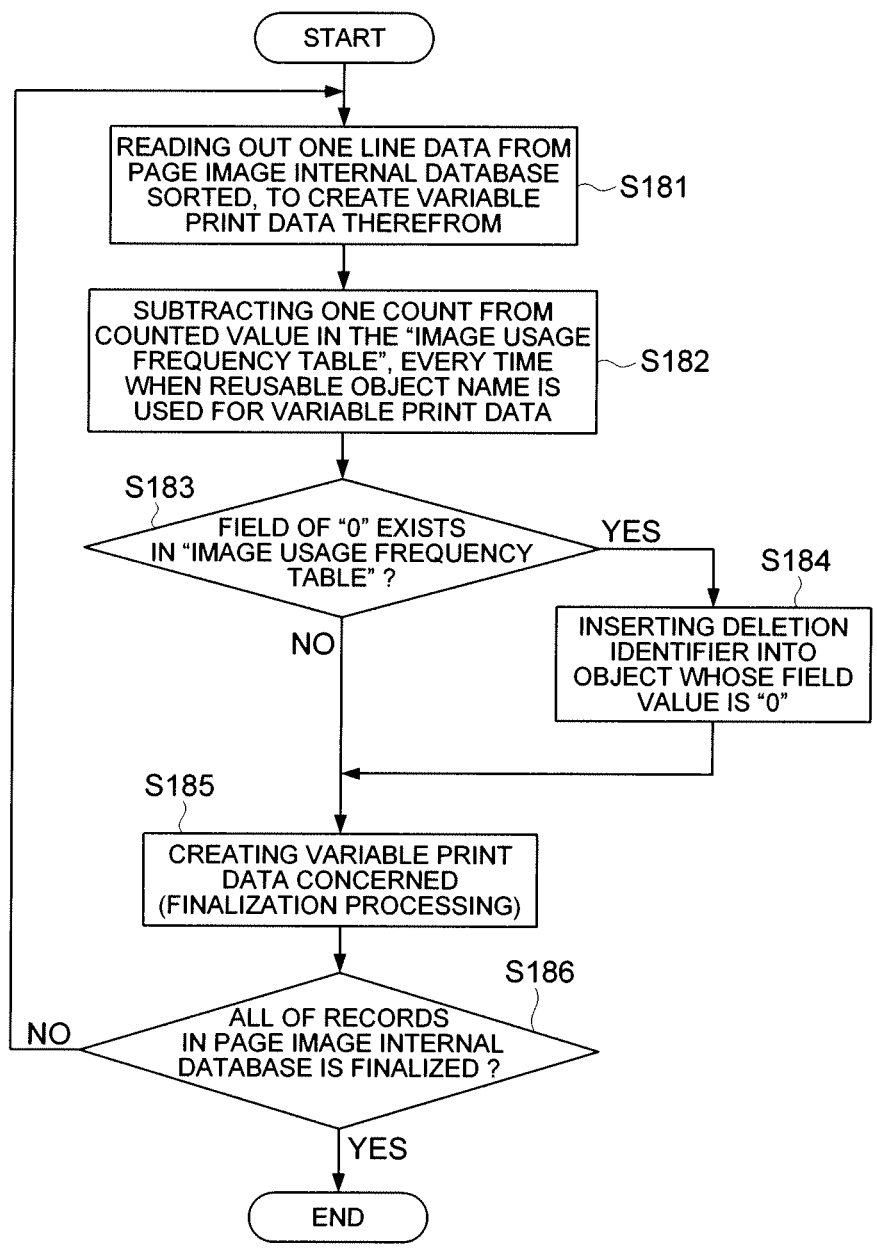
FIG. 11 shows a flowchart indicating a processing procedure to be implemented in a variable print data generating section embodied in the present invention.
Figure 12:
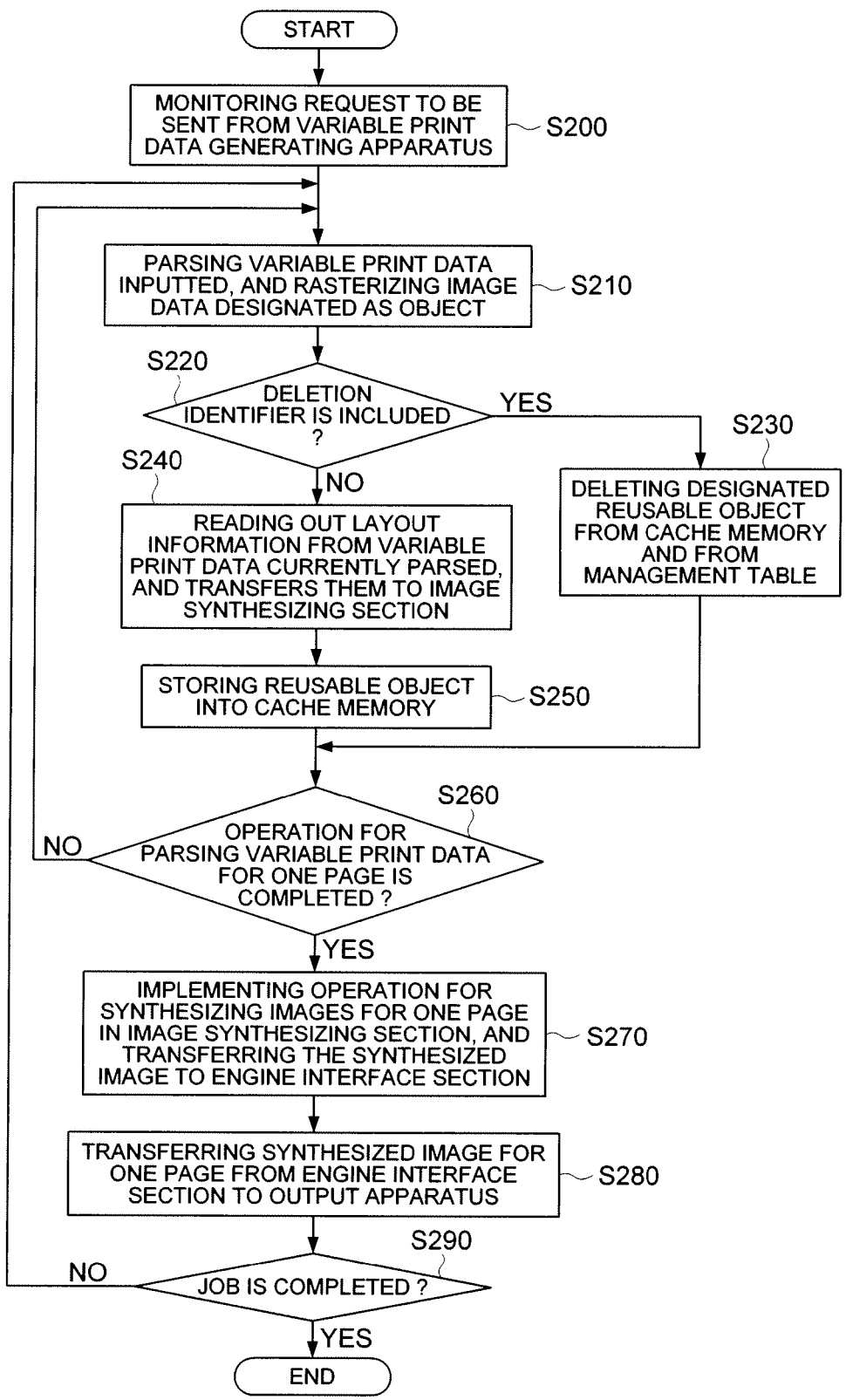
FIG. 12 shows a flowchart indicating a processing procedure to be implemented in a variable printing control apparatus embodied in the present invention.

In order to describe the preferred embodiment of the present invention in detail, referring to FIG. 1 through FIG. 12, a variable printing system embodied in the present invention, will be detailed in the following. FIG. 1 shows a block diagram of a configuration of the variable printing system embodied in the present invention, FIG. 2 shows a block diagram indicating a configuration of the variable print data generating apparatus, and FIG. 3 shows a block diagram indicating a configuration of a variable printing control apparatus. Further, FIG. 4 shows a schematic diagram indicating a created example of a page image internal database (hereinafter, also referred to as a page image internal DB) and FIG. 5 shows a schematic diagram indicating an exemplary process for sorting and grouping the page image internal DB. Still further, FIG. 6 shows a schematic diagram indicating exemplary tables of usage times of various kinds of images and FIG. 7 shows a code list indicating an example of deletion identifier. Yet further, FIGS. 8 and 12 show flowcharts indicating processing procedures to be implemented in the variable printing system embodied in the present invention.

As shown in FIG. 1, a variable printing system 10, embodied in the present invention, is constituted by a variable print data generating apparatus 20 that generates print data written in a variable language, a variable printing control apparatus 30 that parses the print data written in a variable language so as to generate image data for every page, and an output apparatus 40 that implements the printing operation based on the image data for every page. Further, the variable print data generating apparatus 20 and the print control apparatus 30 are coupled to each other through a network, such as a LAN (Local Area Network), a WAN (Wide Area Network), etc., while the variable printing control apparatus 30 and the output apparatus 40 are coupled to each other through an exclusive interface line.

The variable print data generating apparatus 20 is constituted by a CPU (Central Processing Unit) 21, a ROM (Read Only Memory) 22, a RAM (Random Access Memory) 23, an HDD (Hard Disc Drive) 24, a NIC (Network Interface Card) 25, etc., to develop various kinds of programs stored in the ROM 22 and/or the HDD 24 onto the RAM 23 so that the CPU 21 can execute the programs developed on the RAM 23. Further, the HDD 24 stores layout data for specifying the layout positions of the objects (contents) in the variable printing, object data before rasterizing, a customer information database that includes user information and a page image internal database. Still further, the NIC 25 conducts the communication processing operation for communicating with the variable printing control apparatus 30.

The variable printing control apparatus 30 is constituted by a CPU 31, a ROM 32, a RAM 33, a VIF (Video Interface) 34, an HDD 35, a NIC 36, etc., to develop various kinds of programs stored in the ROM 32 onto the RAM 33 so that the CPU 31 can execute the programs developed on the RAM 33. Further, the RAM 33 includes a cache memory for storing reusable object data, a storage area for storing a management table to be used for managing reusable object names (object management table), a working area for conducting an image synthesizing operation and a frame buffer area for storing the synthesized images. The VIF 34 serves as an interface for transferring the image data stored in the frame buffer area to the output apparatus 40

The output apparatus 40 serves as an image forming apparatus, such as a network printer, a multi-functional apparatus, etc.

FIG. 2 shows a block diagram indicating a configuration of various kinds of programs installed in the variable print data generating apparatus 20. By executing corresponding one of the programs installed, the computer serves as any one of a layout control editing section, a variable printing control section, an internal database operation section, a variable print data generating section, etc.

The layout control editing section generates and edits the layout data and stores them into the HDD 24. The layout data includes a layout frame within which various kinds of parts of the variable print data are to be embedded and the control information for embedding image data within the layout frame.

The variable printing control section conducts an operation for linking an item of the client database stored in the HDD 24 with the designated layout frame of layout data, so as to create a page image internal database.

The internal database operation section conducts various kinds of database processing operations for sorting or looping the page image internal database, etc. Based on this page image internal database, the variable print data is created.

The variable print data generating section employs the page image internal database, processed by the internal database operation section, for creating the variable print data In this connection, it is applicable that each of the layout control editing section, the layout control editing section, the variable printing control section, the internal database operation section, the variable print data generating section is configured as either software (program) or hardware.

FIG. 3 shows a block diagram indicating a configuration of various kinds of programs installed in the print control apparatus 30. As shown in FIG. 3, the variable printing control apparatus 30 is provided with the various kinds of programs, corresponding one of which is executed to make a control section, constituted by the CPU 31, the ROM 32 and the RAM 33, serve as any one of an object management section, a variable language parsing section, a RIP (Raster Image Processor) section, an image synthesizing section and an engine interface section.

The object management section stores the reusable object into cache memory and registers the object name into a reusable object management table. When the deletion identifier is designated, the object management section deletes the concerned reusable object from the cache memory and the reusable object management table. Further, the object management section is provided with a function for retrieving a registered reusable object by designating the reusable object name concerned.

The variable language parsing section parses the variable print data sent from the variable print data generating apparatus 20.

The RIP section rasterizes image data, etc., designated as an object.

Based on the page synthesizing information parsed by the variable language parsing section, the image synthesizing section synthesizes the pages with each other. When the reusable object is utilized, the image synthesizing section issues a request for retrieving the object to the object management section, so as to use the received object for the synthesizing operation.

The engine interface section transfers the page image, synthesized by the image synthesizing section, to the output apparatus 40.

In this connection, it is applicable that each of the variable language parsing section, the object management section, the RIP section, the image synthesizing section and the engine interface section is configured as either software (program) or hardware.

Next, the procedure for creating the page image internal database will be detailed in the following.

FIG. 4 shows a schematic diagram indicating a creation example of the page image internal database. The variable print data generating section (variable print application program executed by CPU 31) employs the client database and the VDP layout (layout data) for creating the variable print data. Concretely speaking, the variable print data generating section retrieves a record one by one from the client database, and embeds the column data into each field (layout frame) of the VDP layout, which is correlated to a column name of the database, so as to create the variable print data concerned. Sometimes, a condition is attached to the field of the VDP layout, so as to make it possible to change an image to be synthesized depending on a value of the column data. Since images to be used are individually different from each other, information for representing which image is to be actually used depending on the condition is once stored into the page image internal database, so as to use the information for creating the variable print data.

In the above example shown in FIG. 4, since the "ZIP CODE", the "ADDRESS" and the "NAME" are employed as inputted data as it is, the values in each column are inputted into the page image internal database as it is. A condition is attached to the "Field 1" of the VDP layout, which is linked to the "SEXUALITY" of the client database Based on the condition concerned, if the client is male, the "IMAGE A" is employed, while, if the client is female, the "IMAGE B" is employed. Accordingly, names of images to be employed are inputted into the page image internal database. Since another condition that, if the product to be purchased is "PRODUCT α", the "IMAGE C" is employed, while, if the product to be purchased is "PRODUCT β", the "IMAGE D" is employed, is attached to the "Field 2" of the VDP layout, which is linked to the "PURCHASING PRODUCT" of the client database, names of images to be employed by the "PURCHASING PRODUCT" are inputted into the page image internal database. Since still another condition such that the image to be employed varies depending on the age of the client is attached to the "Field 3" of the VDP layout, which is linked to the "AGE" of the client database, names of images complying with this condition are inputted into the page image internal database. Then, by repeating the abovementioned processing until the end of the client database, the creation of the page image internal database is achieved.

Next, the processing procedure for sorting and grouping the page image internal database will be detailed in the following.

FIG. 5 shows a schematic diagram indicating an example of sorting and grouping the page image internal database, based on the usage frequencies of images. While, FIG. 6 shows another schematic diagram indicating an example of the usage frequency table, which is to be utilized for sorting and grouping the page image internal database, based on the usage frequencies of images.

The names of images, included in the "PAGE IMAGE INTERNAL DATABASE" from Field 1 to Field 3 indicated in table (a) shown in FIG. 5, are counted for every image name as a whole, so as to create the "OVERALL IMAGE USAGE FREQUENCY TABLE" indicated in table (d) shown in FIG. 6. In this example, the usage frequency of 5 times of the "IMAGE A" is the highest among the frequencies indicated in the "OVERALL IMAGE USAGE FREQUENCY TABLE". Accordingly, with respect to the "Field 1" including the "IMAGE A", the page image internal database is sorted by employing the "IMAGE A" as the key (herein, the line data sets of the page image internal database are realigned). The result of "SORTING IMAGES IN ORDER OF USAGE FREQUENCY OF FIELD INCLUDING IMAGE WHOSE USAGE FREQUENCY IS HIGHEST" is indicated in table (b) shown in FIG. 5.

Next, within a range of "IMAGE A" in the "Field 1" of "SORTING IMAGES IN ORDER OF USAGE FREQUENCY OF FIELD INCLUDING IMAGE WHOSE USAGE FREQUENCY IS HIGHEST" indicated in table (b) shown in FIG. 5 (with respect to the five print data sets ranked from the uppermost one), the image names included in the "Field 2" and "Field 3" are also counted as well, so as to create the "IMAGE USAGE FREQUENCY TABLE". The result of creating the "USAGE FREQUENCY TABLE WITHIN DESIGNATED RANGE" is indicated in table (e) shown in FIG. 6. Among the frequencies indicated in the "USAGE FREQUENCY TABLE WITHIN DESIGNATED RANGE", the usage frequency of 3 times of the "IMAGE C" is the highest. Accordingly, within the range of the "IMAGE A" in regard to the "Field 1" of "SORTING IMAGES IN ORDER OF USAGE FREQUENCY OF FIELD INCLUDING IMAGE WHOSE USAGE FREQUENCY IS HIGHEST" indicated in table (b) shown in FIG. 5, with respect to the "Field 2" including the "IMAGE C", the page image internal database is sorted by employing the "IMAGE C" as the key. The result of creating "PAGE IMAGE INTERNAL DATABASE AFTER SORTING" is indicated in table (c) shown in FIG. 5. Then, by employing the "PAGE IMAGE INTERNAL DATABASE AFTER SORTING", the variable print data is created.

In this connection, according to the example shown in FIG. 5, the usage frequency of each of the images (reusable object) included in the "PAGE IMAGE INTERNAL DATABASE" from Field 1 to Field 3 is equal to or more than two times. However, it is also applicable that an image, which is to be used only once, is included in the "PAGE IMAGE INTERNAL DATABASE".

Further, in order to efficiently conduct the image synthesizing operation in the variable printing control apparatus 30, the page image internal database is sorted on the basis of a specific image having a high usage frequency in the example shown in FIG. 5. However, it is also applicable that the page image internal database is sorted on the basis of another specific image having a low usage frequency, when a higher priority is given to the operation for deleting the reusable object from the cache memory provided in the variable printing control apparatus 30 as speedily as possible. For instance, in the example shown in FIG. 5, based on the fact that the "IMAGE B" of the "Field 2", the "IMAGE E" and the "IMAGE G" of the "Field 3" have the lowest usage frequency, the realigning operation is conducted so as to rank them at the higher positions within the page image internal database, and as a result, it becomes possible to speedily delete the reusable objects, acquired by applying the RIP (Raster Image Processing) to the abovementioned images, from the cache memory.

Still further, although the realigning operation is conducted on the basis of the usage frequencies of the concerned images in the abovementioned example, it is also possible that the realigning operation is conducted on the basis of the sizes of the image data sets or by taking the sizes of the image data sets into account. When the realigning operation is conducted so as to rank images, having large data sizes, at the higher positions within the page image internal database, it becomes possible to speedily delete the reusable objects, having a large capacity of data, from the cache memory.

Yet further, although all of the images are made to be objects for the sort processing in the abovementioned example, among the objects to be used in the variable printing, a certain special object, an effective range of which is not specified (called a global object), is included. Accordingly, no problem would arise even if the reusable object that is equivalent to the global object were deleted from the cache memory. Therefore, it is possible that the variable print data generating apparatus 20 inquires of the variable printing control apparatus 30 or the server that controls the objects, so as to specify the special reusable object that is equivalent to the grovel object, and limits the scope of reusable objects to be sorted to those other than the grovel object. As a result, by excluding the reusable object that is equivalent to the grovel object, it becomes possible to conduct the image synthesization processing and the sort processing more efficiently than ever.

Next, the deletion identifier that instructs the operation for deleting the reusable object will be detailed in the following.

FIG. 7 shows an example of the deletion identifier. In this example, the PPML (Personalized Print Markup Language) is employed as the variable printing language. The PPML is provided with an element of "PRIVATE_INFO", which is to be used for defining the deletion identifier. The reason why the element of "PRIVATE_INFO" is employed is lies on the fact that it causes no grammatical and/or syntactical error in the sentence structure even for the variable printing control apparatus, which cannot recognize the deletion identifier, but simply reads through the sentence. Although it is assumed that the UTF-8 is employed for encoding the characters, any other encoding method would be also applicable for this purpose.

In the example shown in FIG. 7, the lines 1-15 represent the definition of the reusable object. Among the lines, the code of <Name="BSKK_reusable0001">, designated as the "OCCURRENCE" element in the eighth line, represents the name of the reusable object concerned. The code written in the tenth line represents the image conversion designation designated for the reusable object concerned, while the code written in the eleventh line represents the clip designation designated for the reusable object concerned. In this connection, when the designated reusable object becomes unnecessary thereafter, the deletion identifier is designated so as to delete the reusable object, currently stored in the variable printing control apparatus 30, from the cache memory thereof.

The lines 20-22 represent a usage example of the deletion identifier. The "PRIVATE_INFO" element is employed for designating the "DELETE_REUSABLE_OBJECT" element therein. This element is created uniquely. The code of <Name="BSKK_reusable0001"> is attached to the "DELETE_REUSABLE_OBJECT" element so as to designate the name of reusable object. In this connection, it may be applicably defined that, when the name of reusable object is omitted, all of the reusable objects should be deleted.

As described in the foregoing, during the process for creating the variable print data, the variable print data generating apparatus 20 conducts the operation for sorting and/or grouping the page image internal database based on the usage frequencies of the concerned images (reusable objects). Associating with the grouping operation, when a specific reusable object that will be not used, thereafter, exists, the variable print data generating apparatus 20 creates such variable print data that inserts the deletion identifier into the specific reusable object, and transmits the variable print data above-created to the variable printing control apparatus 30. Receiving the variable print data sent from the variable print data generating apparatus 20, the variable printing control apparatus 30 deletes the designated reusable object from the cache memory, when determining that the variable print data includes the deletion identifier, while, when determining that the variable print data does not include the deletion identifier, proceeds to process the variable print data concerned.

Next, referring to the flowcharts shown in FIG. 8 through FIG. 12, the processing to be conducted in the variable printing system, embodied in the present invention, will be detailed in the following.

<Processing to be Conducted by Variable Print Data Generating Apparatus 20>

Figure 9:
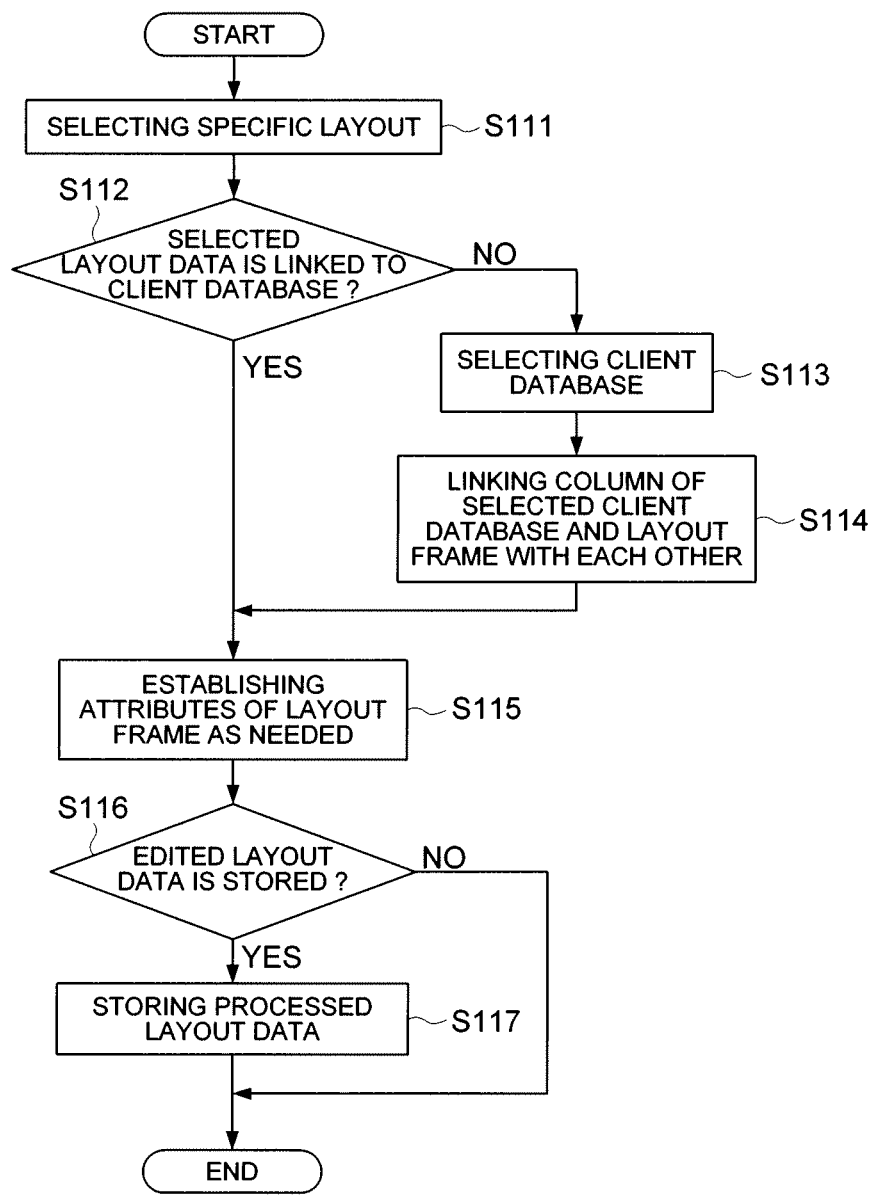
FIG. 9 shows a flowchart indicating a processing procedure to be implemented in a layout control editing section embodied in the present invention.

As shown in FIG. 8, receiving a request for printing issued by the user (Step S100), the layout control editing section creates layout data (Step S110). FIG. 9 shows a flowchart indicating a processing procedure to be conducted in the layout control editing section.

The layout control editing section selects a specific layout that agrees with the request for printing from various kinds of layout data stored in the HDD 24 (Step S111), so as to determine whether or not the selected layout data is linked to the client database (Step S112). When determining that the selected layout data is not linked to the client database, the layout control editing section selects a suitable client database (Step S113), and makes items, included in the selected client database (column), link with the layout frame (Step S114). Successively, the layout control editing section establishes attributes of the layout frame as needed (Step S115). For instance, the layout control editing section establishes a width and a height of an object to be pasted within the layout frame and an image operation to be applied to the concerned object (such as an image size expansion/reduction, an image rotation, an operation for matching the size of the object with that of the corresponding frame, etc.). Then, when storing the layout data established and/or changed (Step S116; Yes), the layout control editing section stores the processed layout data into the HDD 24 (Step S117).

Still successively, returning to the flowchart shown in FIG. 8, the variable printing control section creates the page image internal database corresponding to the fields disposed on the VDP layout, in order to list information serving as basic data for creating the variable print data (Step S120).

Still successively, the variable printing control section reads out one of records from the client database, so as to apply the column data of the client database to the field of the VDP layout linked with the column concerned (Step S130). When no condition is attached to the field of the VDP layout, the column data is inputted as it is, while, when a certain condition is attached to the field of the VDP layout, the name of image that agrees with the condition concerned is inputted (Step S140), so as to add input information for one page as a new record of the page image internal database (Step S150). Then, the variable printing control section repeats the above-mentioned consecutive processing until the client database is finalized, so as to complete the page image internal database (Step S160).

Still successively, based on the usage frequencies, the internal database operation section conducts the operation for sorting and grouping the page image internal database completed in the above (Step S170). FIG. 10 shows a flowchart indicating a concrete processing procedure to be conducted in the internal database operation section.

According to each of the names of images stored in the page image internal database, the internal database operation section counts usage times of each of the images in the image field (Step S171), so as to complete the creation of the "OVERALL IMAGE USAGE FREQUENCY TABLE" indicated in table (d) shown in FIG. 6 (Step S172). Successively, with respect to the field that includes a specific image having the highest usage frequency (highest number of usage times), the internal database operation section applies the sort processing to the page image internal database by employing the specific image as the key (Step S173). Unless the sort processing have been completed with respect to all of the fields (Step S174; No), within a range of images having the maximum number of usage times, the internal database operation section counts the number of usage times of the image that is used in the field other than those serving as the sorting object (Step S175), and then, returns to Step S173 so as to repeat the same processing. After that, when the sort processing have been completed with respect to all of the fields, the internal database operation section stores the "IMAGE USAGE FREQUENCY TABLE" created in Step S172 into the HDD 24, etc. (Step S176), in order to make it possible to employ the "IMAGE USAGE FREQUENCY TABLE" for creating variable print data at the time when the variable print data is to be created.

Still successively, returning to the flowchart shown in FIG. 8, the variable print data generating section creates the variable print data by using the page image internal database sorted and grouped according to the usage frequency (Step S180). FIG. 11 shows a flowchart indicating a concrete processing procedure to be conducted in the variable print data generating section.

The variable print data generating section reads out one line data from the page image internal database sorted, to create the variable print data therefrom (Step S181), and then, subtracts one count from the counted value in the "IMAGE USAGE FREQUENCY TABLE" (decrement of the counted value), every time when the reusable object name is used for the variable print data (Step S182). Successively, the variable print data generating section determines whether or not the field of "0" exists in the "IMAGE USAGE FREQUENCY TABLE" (Step S183). When determining that the field of "0" exists (Step S183; Yes), the variable print data generating section inserts the deletion identifier into the variable print data (Step S184) to create the variable print data concerned (Step S185), since it can be determined that the reusable object concerned is unnecessary from now on. Further, the variable print data generating section repeats the abovementioned consecutive operations for creating the variable print data (Step S186; No), until no more records remain in the page image internal database (Step S186; Yes).

Yet successively, returning to the flowchart shown in FIG. 8, the control section transfers the above-created variable print data to the variable printing control apparatus 30 as a job.

The variable printing control apparatus 30 applies various kinds of processing to the job transmitted from the variable print data generating apparatus 20. FIG. 12 shows a flowchart indicating the consecutive operations to be conducted by the variable printing control apparatus 30.

<Processing to be Conducted by Variable Printing Control Apparatus>

As shown in FIG. 12, the control section monitors the request to be sent from the variable print data generating apparatus 20 (Step S200). When receiving the streamed variable print data (PPML data), the control section makes the variable language parsing section parse the variable print data inputted, and makes the RIP section rasterize the image data designated as the object (Step S210). Successively, the variable language parsing section determines whether or not the PPML data includes the deletion identifier (Step S220). When determining that the PPML data includes the deletion identifier, the variable language parsing section deletes the designated reusable object from the cache memory and further deletes its entry from the management table (Step S230). When determining that the PPML data does not include the deletion identifier, the variable language parsing section reads out layout information, etc., from the variable print data currently parsed, and transfers them to the image synthesizing section (Step S240), while stores the reusable object into the cache memory (Step S250).

When completing the operation for parsing the variable print data for one page (Step S260; Yes), the image synthesizing section implements the operation for synthesizing images for one page, and transfers the synthesized image to the engine interface section (Step S270). Then, the engine interface section transfers the synthesized image for one page to the output apparatus 40 (Step S280). After that, the engine interface section determines whether or not the concerned job is completed (Step S290). When determining that the concerned job is not completed (Step S290; No), the engine interface section returns to Step S210 so as to repeat the consecutive operations above-mentioned.

As described in the foregoing, the variable print data generating apparatus 20 creates: the page image internal database in which the parts constituting the page image are aligned; counts the images of each of the image fields in the page image internal database; applies the sorting and grouping processing to the page image internal database based on the usage frequencies of the images; and inserts the deletion identifier that instructs the operation for deleting the reusable object acquired by rasterizing the image, which will not be used from now on. Accordingly, since the sort processing is conducted in the process of creating the variable print data, it becomes possible to speedily implement the variable printing based on the streamed variable print data, while suppressing the resources.

In this connection, the scope of the present invention is not limited to the embodiments aforementioned. Any modifications and additions made by a skilled person without departing from the spirit and scope of the invention shall be included in the scope of the present invention. For instance, although the variable printing system 10, described in the aforementioned embodiments, includes the variable printing control apparatus 30 and the output apparatus 40 as the separate apparatuses, it is also applicable that the abovementioned two apparatuses are integrated as a single apparatus.

The present invention is available for such a system that includes a variable print data generating apparatus and a variable printing control apparatus, and specifically, such the system that the variable print data generating apparatus transmits the streamed variable print data.

According to the variable printing system embodied in the present invention, it becomes possible to efficiently implement the variable printing operation based on the streamed variable print data.

This is because, the variable print data generating apparatus creates a database, in which various kinds of parts to be embedded into each of pages of the variable printing are aligned, and sorts the created database by employing a reusable object as a key so as to conduct grouping operation, and creates variable print data in which an identifier, indicating an instruction for deleting a specific reusable object that will not be used in following pages, is embedded into a potion for describing page information including information in regard to the specific reusable object, and streams the above-created variable print data so as to transmit the streamed variable print data.

Further, this is because, the variable printing control apparatus receives the streamed variable print data to rasterized the concerned object, and synthesizes the rasterized data with each other so as to create image data for every page, and at the same time, conducts such the controlling operation to delete specific rasterized data of the specific reusable object, designated by the identifier, from the cache memory.

While the preferred embodiments of the present invention have been described using specific term, such description is for illustrative purpose only, and it is to be understood that changes and variations may be made without departing from the spirit and scope of the appended claims.

What is claimed is:
1. A variable printing system, comprising:
   a variable print data generating apparatus that creates variable print data and applies a stream processing to the variable print data so as to transmit streamed variable print data;
   a variable printing control apparatus that receives the streamed variable print data, transmitted by the variable print data generating apparatus, to sequentially create page image data one by one; and
   a communication network through which the variable print data generating apparatus and the variable printing control apparatus are coupled to each other,
   wherein the variable print data generating apparatus includes:
      a variable printing control section to create a database in which parts to be embedded into each of pages are aligned;

a database operation section to sort the database by employing a reusable object, included in the parts, as a key, so as to create sorted database; and a variable print data generating section that creates the variable print data based on the sorted database, and embeds instruction information, representing an instruction for deleting a specific reusable object that will not be used in following pages, into a portion for describing page information including information in regard to the specific reusable object, and wherein the variable printing control apparatus includes:

a variable language parsing section to parse the streamed variable print data, transmitted by the variable print data generating apparatus, and to discriminate the instruction information;

a RIP (Raster Image Processor) section to rasterize objects including the reusable object and the specific reusable object;

an image synthesizing section to synthesize rasterized data sets, acquired by rasterizing the objects, so as to create image data for every page; and an object management section that stores the rasterized data sets, acquired by rasterizing the objects in the RIP section, into a cache memory, and then, deletes a specific rasterized data set, acquired by rasterizing the specific reusable object instructed by the instruction information, from the cache memory, after the image synthesizing section creates image data of a page in which the instruction information is embedded.

2. The variable printing system of claim 1, wherein the database operation section sorts the database by employing a reusable object, a usage frequency of which is highest, as a key, so as to group pages including the concerned reusable object.

3. The variable printing system of claim 1, wherein the variable print data is written in a PPML (Personalized Print Markup Language), and the instruction information is defined in a "PRIVATE_INFO" element.

* * * * *